United States Patent
Koeppel

(10) Patent No.: US 10,970,691 B2
(45) Date of Patent: Apr. 6, 2021

(54) SYSTEM, METHOD, AND APPARATUS FOR REPROGRAMMING A TRANSACTION CARD

(71) Applicant: Capital One Services, LLC., McLean, VA (US)

(72) Inventor: Adam Koeppel, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 438 days.

(21) Appl. No.: 14/977,698

(22) Filed: Dec. 22, 2015

(65) Prior Publication Data

US 2016/0180306 A1 Jun. 23, 2016

Related U.S. Application Data

(60) Provisional application No. 62/095,174, filed on Dec. 22, 2014.

(51) Int. Cl.
*G06Q 20/10* (2012.01)
*G06Q 20/34* (2012.01)
*G06Q 20/40* (2012.01)

(52) U.S. Cl.
CPC ......... *G06Q 20/105* (2013.01); *G06Q 20/341* (2013.01); *G06Q 20/352* (2013.01); *G06Q 20/409* (2013.01)

(58) Field of Classification Search
CPC .. G06Q 20/105; G06Q 20/341; G06Q 20/352; G06Q 20/409; G06Q 20/10; G06Q 20/34; G06Q 20/40
See application file for complete search history.

(56) References Cited

U.S. PATENT DOCUMENTS 5,332,889 A 7/1994 Lundstrom et al.
5,585,787 A 12/1996 Wallerstein
(Continued)

OTHER PUBLICATIONS

Costas Lambrinoudakis, "Smart card technology for deploying a secure information management framework," 2000, vol. 19, No. 3 / 4, pp. 147-158. (Year: 2000).*
(Continued)

*Primary Examiner* — Kenneth Bartley
(74) *Attorney, Agent, or Firm* — Troutman Pepper Hamilton Sanders LLP; Christopher J. Forstner; John A. Morrissett

(57) ABSTRACT

A system for reprogramming a transaction card may include a reprogrammable microchip transaction card, an account provider system, and a mobile device. A reprogrammable transaction card may include an embedded microprocessor chip, or integrated circuit (IC), housing various modules to provide card capabilities, such as transaction capabilities, security capabilities, and reprogramming capabilities. An account provider system may include a number of servers and computers, each equipped with storage and modules programmed with various capabilities, such as, storing cardholder data, transaction processing, and/or transaction card reprogramming. A user device may include various hardware and software components, such as a Near Field Communication (NFC) hardware and software components, one or more processors, various input/output interfaces, and/or modules, such as transaction processing modules and transaction card resetting modules. Each component of the system may communicate with each other in order to reprogram the transaction card.

20 Claims, 5 Drawing Sheets

(56) References Cited

U.S. PATENT DOCUMENTS

| | | | | |
|---|---|---|---|---|
| 5,648,647 A * | 7/1997 | Seiler | G06Q 20/3437 | 235/375 |
| 5,841,119 A * | 11/1998 | Rouyrre | G06K 19/0723 | 235/380 |
| 6,003,014 A * | 12/1999 | Lee | G06Q 20/105 | 705/13 |
| 6,005,942 A * | 12/1999 | Chan | G06F 21/51 | 235/379 |
| 6,178,234 B1 * | 1/2001 | Cai | H04M 15/00 | 379/114.15 |
| 6,481,632 B2 * | 11/2002 | Wentker | G06F 8/60 | 235/376 |
| 7,194,591 B2 * | 3/2007 | Takemura | G06Q 20/341 | 380/258 |
| 7,472,829 B2 * | 1/2009 | Brown | G06K 19/06206 | 235/380 |
| 7,909,247 B2 * | 3/2011 | Bonalle | G06K 19/06187 | 235/375 |
| 7,941,197 B2 * | 5/2011 | Jain | G06Q 20/352 | 455/575.8 |
| 7,991,694 B2 * | 8/2011 | Takayama | G06Q 20/04 | 705/41 |
| 8,037,315 B2 * | 10/2011 | Miyazaki | G06K 9/0002 | 382/115 |
| 8,041,608 B2 * | 10/2011 | Enroughty | G06Q 20/10 | 705/26.1 |
| 8,070,058 B2 * | 12/2011 | Bonalle | G06K 19/06187 | 235/375 |
| 8,201,733 B2 * | 6/2012 | Bonalle | G06K 19/06187 | 235/375 |
| 8,341,083 B1 * | 12/2012 | Jain | G06K 19/07739 | 705/41 |
| 8,348,159 B2 * | 1/2013 | Bonalle | G06K 19/06187 | 235/375 |
| 8,494,959 B2 * | 7/2013 | Hathaway | G06Q 20/105 | 705/38 |
| 8,584,938 B2 * | 11/2013 | Bonalle | G06K 19/06187 | 235/375 |
| 8,700,729 B2 * | 4/2014 | Dua | G06Q 20/20 | 705/64 |
| 8,823,497 B2 * | 9/2014 | Hutzler | G06K 9/00892 | 235/382 |
| 8,925,806 B2 * | 1/2015 | Bonalle | G06K 19/06187 | 235/375 |
| 9,033,218 B1 * | 5/2015 | Batra | G06Q 20/341 | 235/375 |
| 9,053,476 B2 * | 6/2015 | Douglas | G06Q 20/322 | |
| 9,330,286 B2 * | 5/2016 | Somani | B25J 9/1679 | |
| 9,384,480 B2 * | 7/2016 | Jain | G06K 19/07739 | |
| 9,406,011 B2 * | 8/2016 | Bartenstein | G06Q 20/3415 | |
| 9,477,852 B1 * | 10/2016 | Neale | G06K 1/128 | |
| 9,514,454 B2 * | 12/2016 | Bonalle | G06K 19/06187 | |
| 9,516,006 B2 * | 12/2016 | Jooste | H04L 63/08 | |
| 9,836,736 B1 * | 12/2017 | Neale | G06Q 20/327 | |
| 2001/0054148 A1 | 12/2001 | Hoornaert et al. | | |
| 2002/0116330 A1 * | 8/2002 | Hed | G06Q 20/10 | 705/39 |
| 2002/0147907 A1 * | 10/2002 | Ross | G06Q 20/045 | 713/159 |
| 2002/0174071 A1 * | 11/2002 | Boudou | G06F 9/44526 | 705/41 |
| 2003/0218066 A1 * | 11/2003 | Fernandes | G06K 7/084 | 235/449 |
| 2004/0094624 A1 * | 5/2004 | Fernandes | G06Q 20/02 | 235/449 |
| 2004/0159700 A1 * | 8/2004 | Khan | G06Q 20/02 | 235/380 |
| 2004/0199474 A1 * | 10/2004 | Ritter | G06Q 20/00 | 705/65 |
| 2004/0225602 A1 * | 11/2004 | Smith | G06Q 40/02 | 705/39 |
| 2004/0250037 A1 * | 12/2004 | Takemura | G06Q 20/341 | 711/164 |
| 2004/0250066 A1 * | 12/2004 | Di Luoffo | G06Q 20/341 | 713/168 |
| 2004/0255081 A1 * | 12/2004 | Arnouse | G06K 7/10079 | 711/115 |
| 2006/0000900 A1 * | 1/2006 | Fernandes | G06Q 20/04 | 235/380 |
| 2006/0016881 A1 * | 1/2006 | Roux | G07F 7/0866 | 235/380 |
| 2006/0151599 A1 * | 7/2006 | Awatsu | G07C 9/257 | 235/380 |
| 2006/0165060 A1 * | 7/2006 | Dua | G06Q 20/20 | 370/352 |
| 2008/0015946 A1 * | 1/2008 | Enroughty | G06Q 20/105 | 705/41 |
| 2008/0099552 A1 * | 5/2008 | Grillion | G06Q 20/10 | 235/380 |
| 2008/0110977 A1 * | 5/2008 | Bonalle | G06K 19/06187 | 235/380 |
| 2008/0126260 A1 * | 5/2008 | Cox | G06Q 20/20 | 705/67 |
| 2008/0126262 A1 * | 5/2008 | Brady | G06Q 20/04 | 705/75 |
| 2008/0223925 A1 * | 9/2008 | Saito | G06Q 20/341 | 235/380 |
| 2008/0301037 A1 * | 12/2008 | Monk | G06Q 20/10 | 705/38 |
| 2009/0039153 A1 * | 2/2009 | Sarkis, Jr. | A61B 5/14546 | 235/380 |
| 2009/0048971 A1 * | 2/2009 | Hathaway | G06Q 20/105 | 705/41 |
| 2009/0050686 A1 * | 2/2009 | Kon | G06Q 20/327 | 235/375 |
| 2009/0065571 A1 * | 3/2009 | Jain | G06K 19/07739 | 235/379 |
| 2009/0065572 A1 * | 3/2009 | Jain | G06K 19/07739 | 235/379 |
| 2009/0108063 A1 * | 4/2009 | Jain | G07F 7/1008 | 235/380 |
| 2009/0125429 A1 * | 5/2009 | Takayama | G06Q 20/04 | 705/35 |
| 2009/0143104 A1 * | 6/2009 | Loh | G06O 20/32 | 455/558 |
| 2009/0144202 A1 * | 6/2009 | Hurry | G06Q 20/085 | 705/67 |
| 2009/0198618 A1 * | 8/2009 | Chan | G06Q 20/02 | 705/66 |
| 2009/0236416 A1 * | 9/2009 | Morita | G06K 19/07743 | 235/380 |
| 2010/0024025 A1 * | 1/2010 | Yoshida | G06F 21/34 | 726/9 |
| 2010/0096452 A1 * | 4/2010 | Habraken | G06Q 20/327 | 235/382 |
| 2010/0117791 A1 * | 5/2010 | Inoue | G06F 21/32 | 340/5.52 |
| 2010/0274722 A1 * | 10/2010 | Roberts | G06Q 20/10 | 705/44 |
| 2011/0139869 A1 * | 6/2011 | Bonalle | G06K 19/06187 | 235/380 |
| 2011/0218911 A1 * | 9/2011 | Spodak | G06Q 20/105 | 705/41 |
| 2011/0251955 A1 * | 10/2011 | Lam | G06F 21/32 | 705/41 |
| 2012/0024950 A1 * | 2/2012 | Bonalle | G06K 19/06187 | 235/380 |
| 2012/0074219 A1 * | 3/2012 | Burdett | G06Q 20/322 | 235/380 |
| 2012/0123868 A1 * | 5/2012 | Brudnicki | G06Q 20/20 | 705/14.58 |
| 2012/0123935 A1 * | 5/2012 | Brudnicki | G06Q 20/20 | 705/41 |
| 2012/0123937 A1 | 5/2012 | Spodak | | |
| 2012/0124658 A1 * | 5/2012 | Brudnicki | G06F 21/34 | 726/9 |

(56) References Cited

U.S. PATENT DOCUMENTS

| | | | | |
|---|---|---|---|---|
| 2012/0159612 | A1* | 6/2012 | Reisgies | G06F 21/41 726/18 |
| 2012/0173423 | A1* | 7/2012 | Burdett | G06Q 20/3223 705/44 |
| 2012/0217298 | A1* | 8/2012 | Bonalle | G06K 19/06187 235/380 |
| 2013/0054454 | A1* | 2/2013 | Purves | H04L 67/306 705/41 |
| 2013/0066776 | A1* | 3/2013 | Rifaat | G06Q 20/045 705/41 |
| 2013/0080238 | A1* | 3/2013 | Kelly | G07F 17/3255 705/14.31 |
| 2013/0103523 | A1* | 4/2013 | Okonkwo | G06Q 20/352 705/26.1 |
| 2013/0103524 | A1* | 4/2013 | Springer | G06Q 30/06 705/26.1 |
| 2013/0109307 | A1* | 5/2013 | Reisgies | H04L 63/08 455/41.1 |
| 2013/0126608 | A1* | 5/2013 | Bonalle | G06K 19/06187 235/380 |
| 2013/0159186 | A1* | 6/2013 | Brudnicki | G06Q 20/227 705/44 |
| 2013/0248594 | A1* | 9/2013 | Soom | G06Q 20/3572 235/380 |
| 2014/0006277 | A1* | 1/2014 | Rao | G06Q 20/341 705/41 |
| 2014/0032409 | A1* | 1/2014 | Rosano | G06Q 20/401 705/44 |
| 2014/0048597 | A1* | 2/2014 | Bonalle | G06K 19/06187 235/380 |
| 2014/0081785 | A1* | 3/2014 | Valadas Preto | G06Q 20/3415 705/21 |
| 2014/0188704 | A1* | 7/2014 | Grossman | G06Q 20/354 705/39 |
| 2014/0188718 | A1* | 7/2014 | Grossman | G06Q 20/36 705/41 |
| 2014/0291406 | A1* | 10/2014 | Ko | G06K 19/06206 235/492 |
| 2014/0339315 | A1* | 11/2014 | Ko | G06K 19/06206 235/492 |
| 2014/0373170 | A1* | 12/2014 | Brudnicki | H04L 63/102 726/27 |
| 2015/0032635 | A1* | 1/2015 | Guise | G06Q 20/356 705/72 |
| 2015/0073983 | A1* | 3/2015 | Bartenstein | G06Q 20/3415 705/41 |
| 2015/0113271 | A1* | 4/2015 | Jooste | H04L 63/08 713/168 |
| 2015/0262052 | A1* | 9/2015 | Pahuja | G06Q 20/40145 340/10.52 |
| 2015/0293770 | A1* | 10/2015 | Orii | G06F 11/004 710/9 |
| 2015/0310439 | A1* | 10/2015 | Powell | G06Q 20/409 705/44 |
| 2016/0034723 | A1* | 2/2016 | Somani | B25J 9/1679 235/438 |
| 2016/0048749 | A1* | 2/2016 | Laackmann | G06K 19/0723 235/492 |
| 2016/0104154 | A1* | 4/2016 | Milov | G06Q 20/4012 705/67 |
| 2016/0189127 | A1* | 6/2016 | Amarnath | G06K 19/06037 705/18 |
| 2016/0196547 | A1* | 7/2016 | Bonalle | G06K 19/06187 705/41 |
| 2016/0267469 | A1* | 9/2016 | Somani | G06Q 20/3278 |
| 2017/0048210 | A1* | 2/2017 | Jooste | H04L 63/08 |
| 2017/0185883 | A1* | 6/2017 | Laackmann | G06K 19/07701 |

OTHER PUBLICATIONS

Notification of Transmittal of the International Search Report and the Written Opinion of the International Searching Authority from Application No. PCT/US2015/067268 dated Feb. 25, 2016.

\* cited by examiner

SYSTEM, METHOD, AND APPARATUS FOR REPROGRAMMING A TRANSACTION CARD

CROSS-REFERENCE TO RELATED APPLICATIONS

This application contains subject matter related to and claims the benefit of U.S. Provisional Patent Application No. 62/095,174, filed on Dec. 22, 2014, the entire contents of which is incorporated herein by reference.

FIELD OF THE DISCLOSURE

Embodiments of the disclosure relate to a systems, methods, and apparatus involving a reprogrammable transaction card.

BACKGROUND OF THE DISCLOSURE

In order to replace a transaction card, a cardholder must request a new transaction card through the account provider (e.g., a bank, financial institution, retail store, and other card providers). This process may require an cardholder to physically visit a location associated with the account provider to receive a new card or request a new card to be delivered to the cardholder's address.

An cardholder may be unable to visit the location associated with the account provider (e.g., if the cardholder is out of the country or not near any account provider locations, if the cardholder is unable to visit during business hours, etc.). Additionally, an cardholder may not be able to wait the number of days until a new card is delivered.

These and other drawbacks exist.

SUMMARY OF THE DISCLOSURE

Various embodiments of the present disclosure provide systems, methods, and apparatus for reprogramming a transaction card. In an example embodiment, a system for reprogramming a transaction card may include a reprogrammable microchip transaction card, an account provider system, and a mobile device, such as a smartphone, tablet, phablet, laptop, or the like. A reprogrammable transaction card may include an embedded microprocessor chip, or integrated circuit (IC), housing various modules to provide card capabilities, such as transaction capabilities, security capabilities, and reprogramming capabilities. An account provider system may include a number of servers and computers, each equipped with storage and modules programmed with various capabilities, such as, storing cardholder data, transaction processing, and/or transaction card reprogramming. A user device may include various hardware and software components, such as a Near Field Communication (NFC) hardware and software components, one or more processors, various input/output interfaces, and/or modules, such as transaction processing modules and transaction card resetting modules. Each component of the system may communicate with each other in order to reprogram the transaction card.

A transaction card may be reprogrammed in order to prevent fraudulent use of the transaction card. For example, a card holder may become aware of fraudulent activity associated with a particular reprogrammable transaction card, either via a fraud alert received from the account provider, user device, and/or other system or user. Once aware of fraudulent activity, a card holder and/or account provider (e.g., financial institution) may desire to cancel the current transaction card and reissue a new transaction card. An account provider may automatically shut off the card when fraudulent activity is detected and the account provider may transmit a notification to the cardholder that fraudulent activity is detected, a transaction card has been shut off, and the transaction card should be reprogrammed to reactive the card.

Accordingly, a card holder may reprogram the reprogrammable transaction card using a user device allowing the transaction card to be reprogrammed, or effectively reissued, and ready for immediate and secure use. For example, NFC components of the user device may communicate via radio waves with the microprocessor chip in the reprogrammable transaction card to rewrite the transaction card data and reissue new transaction card data, such as a new transaction card number, to the reprogrammable transaction card.

In order to use a user device to reprogram the microprocessor chip embedded in the transaction card, a reprogramming application may be used on a user device. The reprogramming application may be in the form of a mobile application issued by the account provider via a mobile application provider, such as Google Play or Apple Store. The reprogramming application may require user authentication, such as a password, PIN, and/or biometric data (fingerprint, facial recognition, and the like) in order to generate new transaction card data to reprogram the transaction card.

According to an example embodiment, a user device may include an input/output interface that receives a reprogramming notification; a processor that authenticates a user via at least one authentication factor, wherein following authentication, the input/output interface receives new transaction card data from an account provider system; and an antenna used to establish a contactless connection with a reprogrammable transaction card having an embedded microchip, wherein upon connection, the antenna: transmits, via the contactless connection, instructions to delete at least a portion of existing transaction card data securely stored in the embedded microchip; transmits, via the contactless connection, new transaction card data and instructions to store the new transaction card data thereby replacing the deleted existing transaction card data; receives, via the contactless connection, a response to the instructions to store the new transaction card data; and deactivates the contactless connection with the reprogrammable transaction card. A contactless connection may include, for example, an NFC connection. A response to the instructions to store the new transaction card data may include, for example, a confirmation of replacement or a refusal of replacement.

The authentication factors may include a password, a personal identification number (PIN), and a biometric identifier, and/or any combination of the above. A biometric identifier may include facial recognition, voice recognition, a fingerprint, and/or any combination of the above. A reprogramming notification as discussed herein, may include, for example, a user-initiated notification and/or a third-party system initiated notification. A user-initiated notification may include a notification received via the user device to reprogram the reprogrammable transaction card. A third-party system initiated notification may include, for example, a fraudulent transaction notification from the account provider system, a declined transaction notification from a merchant system, an account expiration notification from the account provider system, and/or a PIN change notification from the account provider system.

New transaction card data may include, for example, a new transaction card number, a new transaction card expiration date, a new transaction card authentication code, new transaction card display data, a new transaction card balance, a new transaction card spending limit, a new transaction card rate, and/or any combination of the above. A portion of existing transaction card data deleted may include, for example, a transaction card number, a transaction card expiration date, a transaction card authentication code, transaction card display data, a transaction card balance, a transaction card spending limit, a transaction card rate, and/or any combination of the above.

A user device also may include an encryption processor that encrypts transmissions, via the contactless connection, including the instructions to store the new transaction card data. Additionally, a user device may include a processor to generate new transaction card data, where the processor may include a random and/or pseudorandom number generator that generates at least a portion of the new transaction card data.

According to an example embodiment, a reprogrammable transaction card may include, an antenna that receives a contactless connection request from a user device; establishes a contactless connection with the user device; receives, via the contactless connection, instruction to delete at least a portion of the stored transaction card data; receives, via the contactless connection, instructions to store new transaction card data; transmits, via the contactless connection, a response to the stored new transaction card data; and deactivates the contactless connection with the user device; and a microprocessor chip connectively coupled to the antenna comprising a secure element to store transaction card data and a microprocessor that deletes the at least a portion of the stored transaction card data in response to receiving the deletion instructions; and stores the new transaction card data in response to receiving the instructions to store new transaction card data. The contactless connection may be a near-field communication (NFC) connection.

New transaction card data may include, for example, a new transaction card number, a new transaction card expiration date, a new transaction card authentication code, new transaction card display data, a new transaction card balance, a new transaction card spending limit, a new transaction card rate, and/or any combination of the above. The transaction card data deleted may include, for example, a transaction card number, a transaction card expiration date, a transaction card authentication code, transaction card display data, a transaction card balance, a transaction card spending limit, a transaction card rate, and/or any combination of the above.

A microprocessor chip of the reprogrammable transaction card may include an encryption processor to encrypt the transaction card data stored on the transaction card, including the new transaction card data. An encryption processor may also encrypt communications sent from the reprogrammable transaction card, such as a transaction card response. A response may include, for example, a confirmation of replacement or a refusal of replacement.

A reprogrammable transaction card may also include a display to display transaction card data, such as, for example, a transaction card number, an expiration date, and/or a card holder name.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems, methods, and devices for reprogramming a transaction card. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only. For example, many other account providers may exist, such as retail stores, transportation providers (e.g., a fare card), a housing provider, and the like.

Additionally, a transaction card is used as an example of a card with an embedded microprocessor chip. A transaction card may be substituted for any other type of card with an embedded microprocessor chip including, for example, cards used in transportation systems, hotel systems, and the like. As such, the disclosure is not intended to be limited to transaction cards. Furthermore, the exemplary use of "mobile device" throughout the application is only by way of example, and the reprogramming of a transaction card may also be used with personal computers, tablet, gaming system, television, or any other device capable of reprogramming a transaction card using, for example NFC technology.

According to the various embodiments of the present disclosure, systems, methods, and devices are provided to reprogram a transaction card with an embedded microprocessor chip. Such embodiments may provide, for example, instant reissuance of a transaction card without having to visit any particular institution. In various embodiments, reprogramming a transaction card could be provided with the assistance of a networked environment, such as an online or cellular network environment, whereby, for example, a mobile device such as a smartphone could receive indication of fraudulent activity associated with a transaction card in "real-time" or near "real-time" via a communication network, generate and/or receive new transaction card data, and communicate with the embedded microprocessor chip in the transaction card to reprogram, or "reissue," the transaction card.

Figure 1:
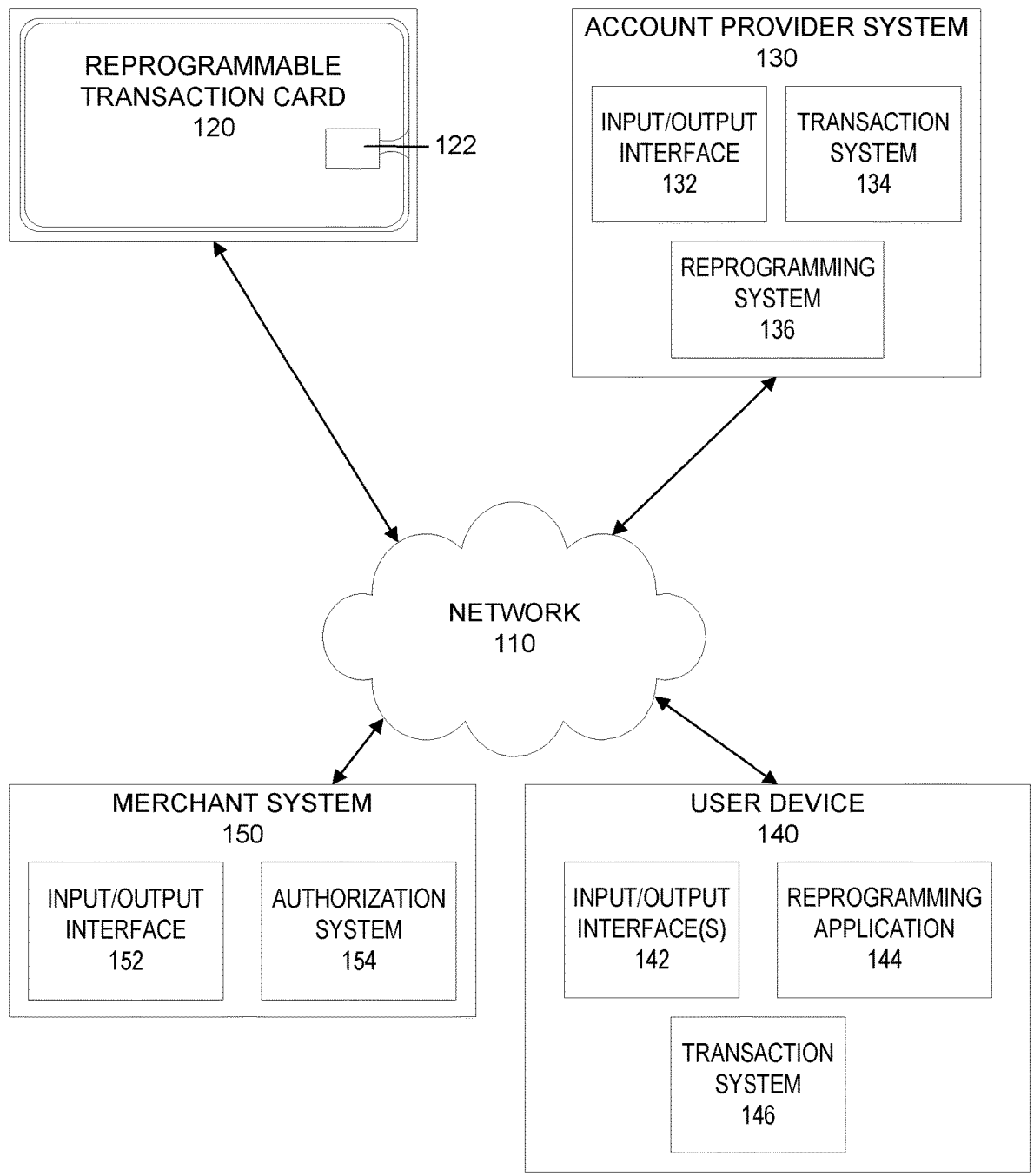
FIG. 1 depicts an example embodiment of a system for reprogramming a transaction card according to embodiments of the disclosure.

FIG. 1 depicts an example system 100 for use with the system and devices for reprogramming a transaction card. As shown in FIG. 1, an example system 100 may include one or more reprogrammable transaction cards 120, one or more account provider systems 130, one or more user devices 140, and one or more merchant systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Account provider system 130, user device 140, and/or merchant system 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account provider system 130, user device 140, and/or merchant system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Account provider system 130, user device 140, and/or merchant system 150 may include at least one central processing unit (CPU), which may be configured to execute computer program instructions to perform various processes and methods. Account provider system 130, user device 140, and/or merchant system 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Account provider system 130, user device 140, and/or merchant system 150 may further include, for example, a processor, which may be several processors, a single processor, or a single device having multiple processors. Although depicted as single elements, it should be appreciated that according to one or more embodiments, account provider system 130, user device 140, and/or merchant system 150 may comprise a plurality of account provider systems 130, user devices 140, and/or merchant systems 150.

Account provider system 130, user device 140, and/or merchant system 150 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

As shown in FIG. 1, each account provider system 130, user device 140, and/or merchant system 150 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include a reprogrammable transaction card 120. A reprogrammable transaction card may include any card with an embedded microprocessor chip 122. A reprogrammable transaction card may include a EuroPay MasterCard Visa (EMV) card, a "Chip and PIN" card, and/or a contactless smart card. A contactless smart card may function using the ISO/IEC 14443 standard and/or the ISO/IEC 15693 standard. A microprocessor chip 122 embedded in the reprogrammable transaction card 120 may include a number of contacts that may be connected and activated using an interface device, such as a user device 140. Once connected and activated the reprogrammable transaction card 120 may be reset and may establish communication between the reprogrammable transaction card 120 and, for example, the user device 140. Connection and communications may be established between the reprogrammable transaction card 120 and other interfacing devices, such as a terminal (not shown), a merchant system 150, and the like. After communication has been established, the reprogramming of the transaction card 120 may be executed using the user device 140 and the embedded microprocessor chip 122. The microprocessor chip contacts may then be deactivated and communication may end.

Account provider system 130 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and AmericanExpress®. Account provider system 130 may include and/or be connected to one or more computer systems and networks to process transactions. Account provider system 130 may include systems associated with financial institutions that issue transaction cards, such as a reprogrammable transaction card 120, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 130 may include an input/output interface 132, a transaction system 134, and a reprogramming system 136. Input/output interface 132 may include for example, I/O devices, which may be configured to provide input and/or output to providing party system 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of providing party system 130, and a bus that allows communication among the various components of providing party system 130. Input/output interface 132 may include a display, which may include for example output devices, such as a printer, display screen (e.g., monitor, television, and the like), speakers, projector, and the like. Although not shown, each providing party system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction system 134 may include various hardware and software components to communicate between a merchant, acquisition system, account provider system, and/or a user device to process a transaction, such as a user purchase. Reprogramming system 136 may include various hardware and software components, such as data storage (not shown) to store transaction card data (e.g., transaction card numbers, security codes, expiration data, PINs, passwords, transaction card balance, transaction card spending limits, transaction card rates, and the like) and cardholder data (e.g., cardholder name, address, phone number(s), email address, demographic data, and the like). Reprogramming system 136 also may include hardware and software components to generate new transaction card data in order to reprogram a transaction card 120. For example, a random and/or pseudorandom number generator may be included in the reprogramming module to generate at least a portion of the transaction card data, a comparison algorithm may be included in the reprogramming module to ensure unique transaction data is generated, and/or various encryption algorithms may be included in the reprogramming module to ensure secure delivery and storage of transaction card data.

A user device 140 may be any device capable communicating with a reprogrammable transaction card 120 and execute various function to reprogram the reprogrammable transaction card 120. For example, user device 140 could be an iPhone, iPod, iPad from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

User device 140 may include for example, an input/output interface(s) 142, a reprogramming application 144, and a transaction system 146. Input/output interface(s) 142 may include an embedded NFC chip that can send encrypted data a short distance ("near field") to other system components, such as a reprogrammable transaction card 120, a merchant system 150, and/or an account provider system 130.

Input/output interface(s) 142 may include for example, I/O devices, which may be configured to provide input and/or output to user device 140 (e.g., keyboard, mouse, display, speakers, printers, modems, network cards, etc.). Input/output interface(s) 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of user device 140, and a bus that allows communication among the various components of user device 140. Input/output interface(s) 142 may include a display, which may include for example output devices, such as a printer, display screen (e.g., monitor, television, and the like), speakers, projector, and the like. Although not shown, each user device 140 may include one or more encoders and/or decoders, one or more interleavers, one or more circular buffers, one or more multiplexers and/or de-multiplexers, one or more permuters and/or deper-muters, one or more encryption and/or decryption units, one or more modulation and/or demodulation units, one or more arithmetic logic units and/or their constituent parts, and the like.

Input/output interface(s) 142 may include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a reprogramming module.

Input/output interface(s) 142 may enable Industry Standard NFC Payment Transmission. For example, the input/output interface(s) 142 may enable two loop antennas to form an air-core transformer when placed near one another by using magnetic induction. Input/output interface(s) 142 may operate at 13.56 MHz or any other acceptable frequency. Also, input/output interface(s) 142 may provide for a passive communication mode, where the initiator device provides a carrier field, permitting answers by the target device via modulation of existing fields. Additionally, input/output interface(s) 142 also may provide for an active communication mode by allowing alternate field generation by the initiator and target devices.

Input/output interface(s) 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output interface(s) 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output interface(s) 142 may be able to utilize transmission protocols and methods that are developed in the future using other frequencies or modes of transmission. Input/output interface(s) 142 may also be backwards-compatible with existing techniques, for example RFID. Also, the system may support transmission requirements to meet new and evolving standards including internet based transmission triggered by NFC.

Reprogramming application 144 may work with input/output interface(s) 142 to reprogram a reprogrammable transaction card 120. For example, reprogramming module may include various hardware and software components such as a processor and data storage to store transaction card data (e.g., transaction card numbers, security codes, expiration data, PINs, passwords, transaction card balance, transaction card spending limits, transaction card rates, and the like) and cardholder data (e.g., cardholder name, address, phone number(s), email address, demographic data, and the like). Reprogramming system 136 also may include hardware and software components to generate new transaction card data in order to reprogram a transaction card 120. For example, a random and/or pseudorandom number generator may be included in the reprogramming module to generate at least a portion of the transaction card data, a comparison algorithm may be included in the reprogramming module to ensure unique transaction data is generated, and/or various encryption algorithms may be included in the reprogramming module to ensure secure delivery and storage of transaction card data.

Transaction application 144 may include various hardware and software components, such as data storage and a processor that may work with input/output interface(s) 142 to communicate between a merchant, acquisition system, account provider system, and/or a user device to process a transaction, such as a user purchase.

User device 140 may also include various software components to facilitate reprogramming a transaction card 120. For example, user device 140 may include an operating system such as, for example, the iOS operating system from Apple, the Google Android operating system, and the Windows Mobile operating system from Microsoft. User device 140 may also include, without limitation, software applications such as mobile banking applications to facilitate reprogramming a transaction card 120, an NFC application programming interface, and software to enable touch sensitive displays. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, and a real-time data (RTD) API and a NFC Data Exchange Format (NDEF) API for reading/writing.

Merchant system 150 may include, among other components, a PoS device (not shown), an input/output interface 152, and an authorization system 154. PoS device may include a variety of readers to read transaction data associated with a transaction taking place with a merchant. PoS device may include various hardware and/or software components required to conduct and process transaction. Merchant system 150 may also include data storage (not shown) to store transaction data and/or approval of charges between an cardholder and the merchant associated An input/output interface 152 may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 152 may include for example, I/O devices, which may be configured to provide input and/or output to and/or from merchant system 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of merchant system 150, and a bus that allows communication among the various components of merchant system 150. Input/output interface 152 may include a display, which may include for example output devices, such as a printer, display screen (e.g., monitor, television, and the like), speakers, projector, and the like. Although not shown, merchant system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Authorization system 154 may include various software and/or hardware component to enable authorization of a transaction at a merchant system using, for example, a PoS device.

Figure 5:
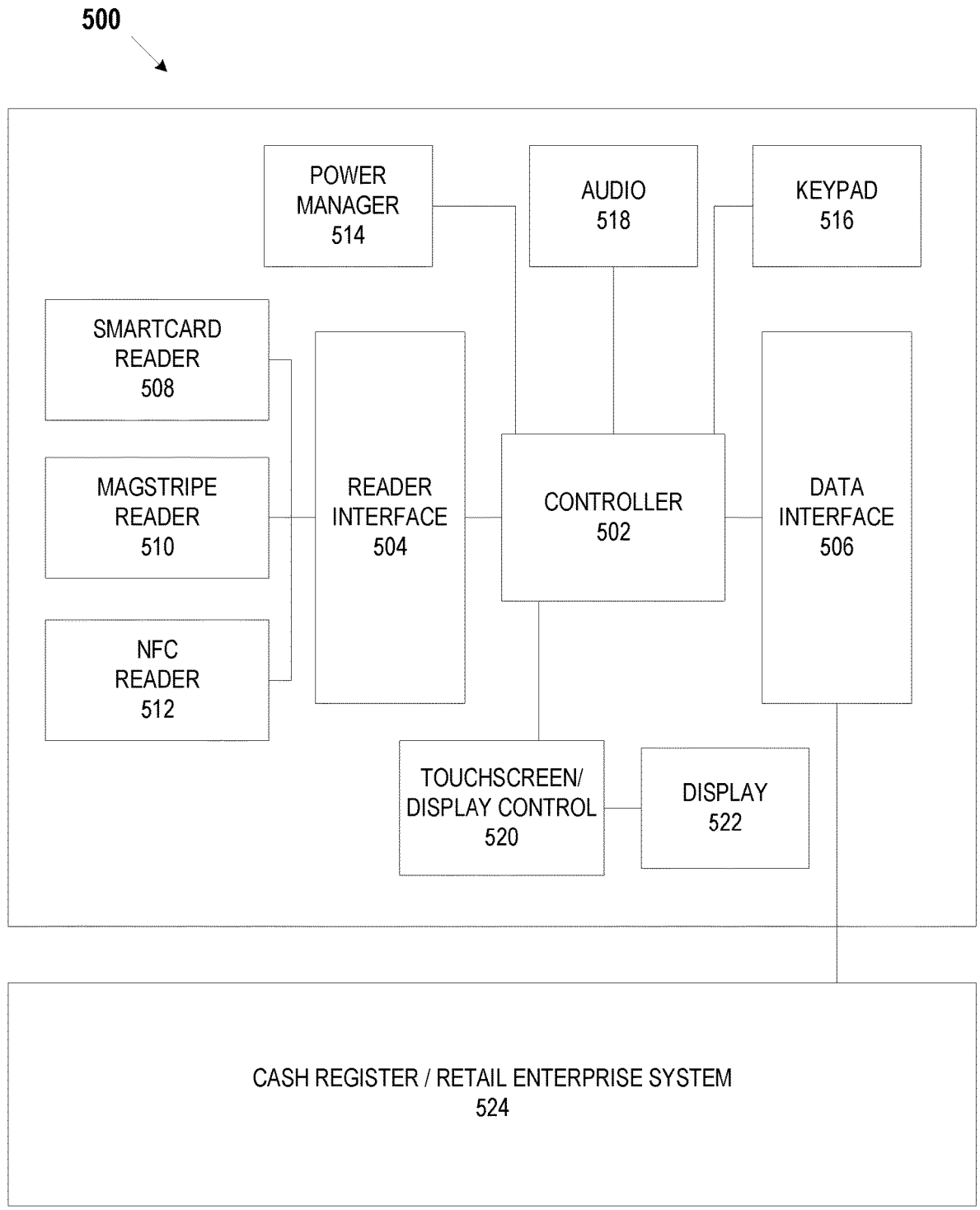
FIG. 5 depicts an example embodiment of a point of sale system associated with a system for reprogramming a transaction card according to embodiments of the disclosure.

FIG. 5 depicts an example Point of Sale (PoS) device 500. PoS device 500 may provide the interface at what a customer or end user makes a payment to the merchant in exchange for goods or services. PoS device 500 may include and/or cooperate with weighing scales, scanners, electronic and manual cash registers, electronic funds transfer at point of sale (EFTPOS) terminals, touch screens and any other wide variety of hardware and software available for use with PoS device 500. PoS device 500 may be a retail point of sale system and may include a cash register and/or cash register-like computer components to enable purchase transactions. PoS device 500 also may be a hospitality point of sale system and include computerized systems incorporating registers, computers and peripheral equipment, usually on a computer network to be used in restaurant, hair salons, hotels or the like. PoS device 500 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 500 also may be a cloud-based point of sale system that can be deployed as software as a service, which can be accessed directly from the Internet using, for example, an Internet browser.

Referring to FIG. 5, an example PoS device 500 is shown. PoS device 500 may include a controller 502, a reader interface 504, a data interface 506, a smartcard reader 508, a magnetic stripe reader 510, a near-field communications (NFC) reader 512, a power manager 514, a keypad 516, an audio interface 518, a touchscreen/display controller 520, and a display 522. Also, PoS device 500 may be coupled with, integrated into or otherwise connected with a cash register/retail enterprise system 524.

In various embodiments, Controller 502 may be any controller or processor capable of controlling the operations of PoS device 500. For example, controller 502 may be a Intel® 2nd Generation Core™ i3 or i5 or Pentium™ G850 processor or the like. Controller 502 also may be a controller included in a personal computer, smartphone device, tablet PC or the like.

Reader interface 504 may provide an interface between the various reader devices associated with PoS device 500 and PoS device 500. For example, reader interface 504 may provide an interface between smartcard reader 508, magnetic stripe reader 510, NFC reader 512 and controller 502. In various embodiments, reader interface 504 may be a wired interface such as a USB, RS232 or RS485 interface and the like. Reader interface 504 also may be a wireless interface and implement technologies such as Bluetooth, the 802.11(x) wireless specifications and the like. Reader interface 504 may enable communication of information read by the various reader devices from the various reader devices to PoS device 500 to enable transactions. For example, reader interface 504 may enable communication of a credit or debit card number read by a reader device from that device to PoS device 500. In various embodiments, reader interface 504 may interface between PoS device 500 and other devices that do not necessarily "read" information but instead receive information from other devices.

Data interface 506 may allow PoS device 500 to pass communicate data throughout PoS device and with other devices including, for example, cash register/retail enterprise system 524. Data interface 506 may enable PoS device 500 to integrate with various customer resource management (CRM) and/or enterprise resource management (ERP) systems. Data interface 506 may include hardware, firmware and software that make aspects of data interface 506 a wired interface. Data interface 506 also may include hardware, firmware and software that make aspects of data interface 506 a wireless interface. In various embodiments, data interface 506 also enables communication between PoS device other devices.

Smartcard reader 508 may be any electronic data input device that reads data from a smart card. Smartcard reader 508 may be capable of supplying an integrated circuit on the smart card with electricity and communicating with the smart card via protocols, thereby enabling read and write functions. In various embodiments, smartcard reader 508 may enable reading from contact or contactless smart cards. Smartcard reader 508 also may communicate using standard protocols including ISO/IEC 7816, ISO/IEC 14443 and/or the like or proprietary protocols.

Magnetic stripe reader 510 may be any electronic data input device that reads data from a magnetic stripe on a credit or debit card, for example. In various embodiments, magnetic stripe reader 510 may include a magnetic reading head capable of reading information from a magnetic stripe. Magnetic stripe reader 510 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 512 may be any electronic data input device that reads data from a NFC device. In an exemplary embodiment, NFC reader 512 may enable Industry Standard NFC Payment Transmission. For example, the NFC reader 512 may communicate with a NFC enabled device to enable two loop antennas to form an air-core transformer when placed near one another by using magnetic induction. NFC reader 512 may operate at 13.56 MHz or any other acceptable frequency. Also, NFC reader 512 may enable a passive communication mode, where an initiator device provides a carrier field, permitting answers by the target device via modulation of existing fields. Additionally, NFC reader 512 also may enable an active communication mode by allowing alternate field generation by the initiator and target devices.

In various embodiments, NFC reader 512 may deactivate an RF field while awaiting data. NFC reader 512 may receive communications containing Miller-type coding with varying modulations, including 100% modulation. NFC reader 512 also may receive communications containing Manchester coding with varying modulations, including a modulation ratio of approximately 10%, for example. Additionally, NFC reader 512 may be capable of receiving and transmitting data at the same time, as well as checking for potential collisions when the transmitted signal and received signal frequencies differ.

NFC reader 512 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 512 may be able to utilize transmission protocols and methods that are developed in the future using other frequencies or modes of transmission. NFC reader 512 also may be backwards-compatible with existing payment techniques, such as, for example RFID. Also, NFC reader 512 may support transmission requirements to meet new and evolving payment standards including internet based transmission triggered by NFC. In various embodiments, NFC reader 512 may utilize MasterCard's® PayPass and/or Visa's® PayWave and/or American Express' ® ExpressPay systems to enable transactions.

Although not shown and described, other input devices and/or readers, such as for example, barcode readers and the like are contemplated.

Power manager 514 may be any microcontroller or integrated circuit that governs power functions of PoS device 500. Power manager 514 may include, for example, firmware, software, memory, a CPU, a CPU, input/output functions, timers to measure intervals of time, as well as analog to digital converters to measure the voltages of the main battery or power source of PoS device 500. In various embodiments, Power manager 514 remain active even when PoS device 500 is completely shut down, unused, and/or powered by the backup battery. Power manager 514 may be responsible for coordinating many functions, including, for example, monitoring power connections and battery charges, charging batteries when necessary, controlling power to other integrated circuits within PoS device 500 and/or other peripherals and/or readers, shutting down unnecessary system components when they are left idle, controlling sleep and power functions (on and off), managing the interface for built-in keypad and trackpads, and/or regulating a real-time clock (RTC).

Keypad 516 may any input device that includes a set of buttons arranged, for example, in a block or pad and may bear digits, symbols and/or alphabetical letters. Keypad 516 may be a hardware-based or mechanical-type keypad and/or implemented in software and displayed on, for example, a screen or touch screen to form a keypad. Keypad 516 may receive input from a user that pushed or otherwise activates one or more buttons on keypad 516 to provide input.

Audio interface 518 may be any device capable of providing audio signals from PoS device 500. For example, audio interface may be a speaker or speakers that may produce audio signals. In various embodiments, audio interface 518 may be integrated within PoS device 500. Audio interface 518 also may include components that are external to PoS device 500.

Touchscreen/display control 520 may be any device or controller that controls an electronic visual display. Touchscreen/display control 520 may allow a user to interact with PoS device 500 through simple or multi-touch gestures by touching a screen or display (e.g., display 522). Touchscreen/display control 520 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 520 may receive inputs from the touchscreen and process the received inputs. Touchscreen/display control 520 also may control the display on PoS device 500, thereby providing the graphical user interface on a display to a user of PoS device 500.

Display 522 may be any display suitable for a PoS device. For example, display 522 may be a TFT, LCD, LED or other display. Display 522 also may be a touchscreen display that for example allows a user to interact with PoS device 500 through simple or multi-touch gestures by touching a screen or display (e.g., display 522). Display 522 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 522 may receive inputs from control gestures provided by a user. Display 522 also may display images, thereby providing the graphical user interface to a user of PoS device 500.

Cash register/retail enterprise system 524 may me any device or devices that cooperate with PoS device 500 to process transactions. Cash register/retail enterprise system 524 may be coupled with other components of PoS device 500 via, for example, a data interface (e.g., data interface 506) as illustrated in FIG. 5. Cash register/retail enterprise system 524 also may be integrated into PoS device 500.

In various embodiments, cash register/retail enterprise system 524 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 524 may comprise an retail enterprise system and/or a customer relationship management system. Retail enterprise system 524 may enable retain enterprises to manage operations and performance across a retail operation. Retail enterprise system 524 may be a stand-alone application in, for example, individual stores, or may be interconnected via a network. Retail enterprise system 524 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 524 also may include inventory control and tracking capabilities, reporting tools, customer management capabilities, employee management tools, and may integrate with other accounting software.

In various embodiments cash register/retail enterprise system 524 may be a hospitality PoS. In such embodiments, retail enterprise system 524 may include hospitality PoS software (e.g, Aloha PoS Restaurant software from NCR®, Micros® RES and Symphony software and the like), hospitality management software, and other hardware and software to facilitate hospitality operations.

Figure 2:
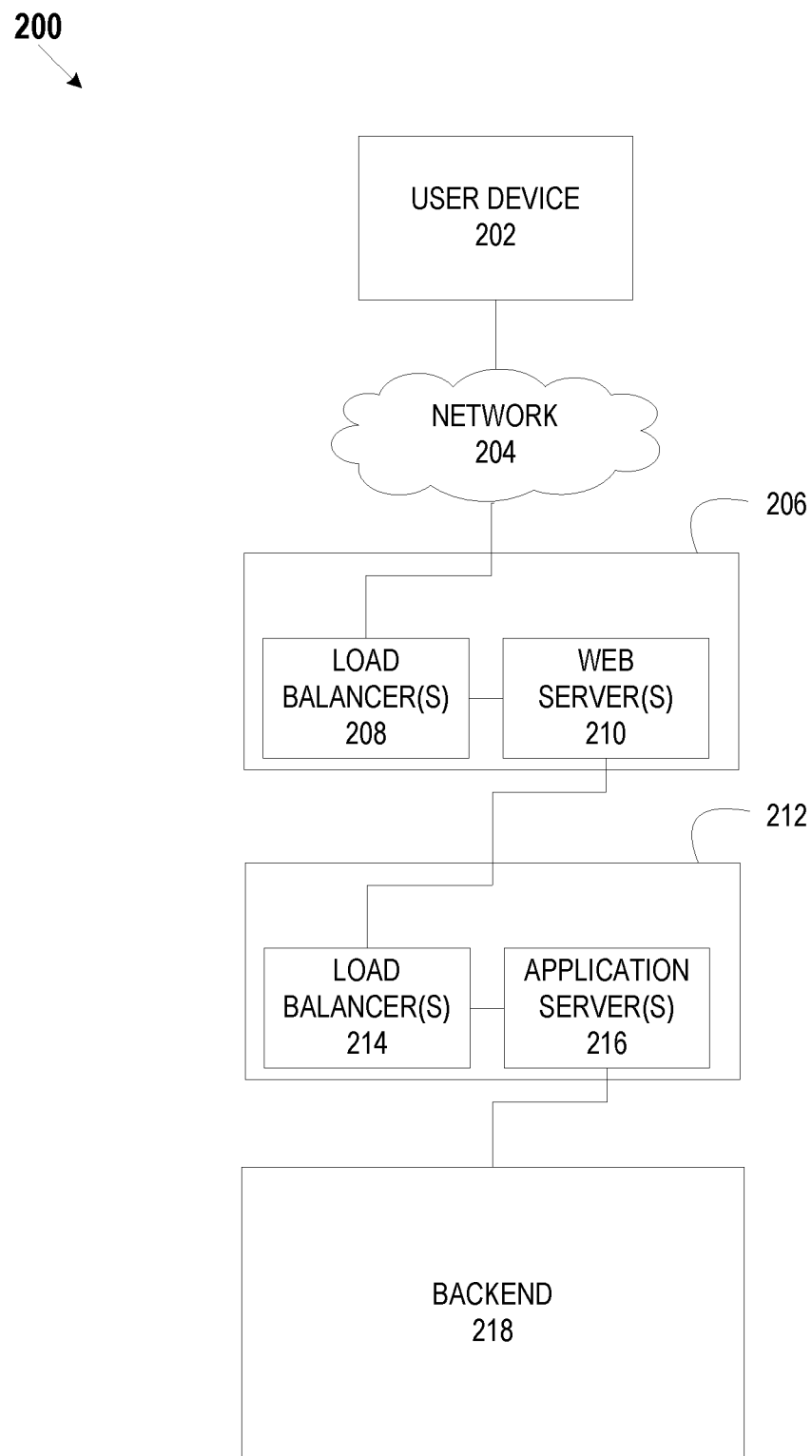
FIG. 2 depicts an example embodiment of a system for reprogramming a transaction card according to embodiments of the disclosure.

FIG. 2 depicts an example system used in reprogramming a transaction card. The example system 200 in FIG. 2 may enable a financial institution, for example, to provide network services to its cardholders. As shown in FIG. 2, system 200 may include a user device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

User device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

User device 202 also may be a mobile device. For example, a mobile device may include an iPhone, iPod, iPad from Apple® or any other mobile device running Apple's iOS operating system, any device running Google's Android® operating system, including, for example, Google's wearable device, Google Glass, any device running Microsoft's Windows® Mobile operating system, and/ or any other smartphone or like wearable mobile device.

Cardholder device 202 also may be similar to cardholder device 120 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, cardholder device 202, connect to access various services of a financial institution, for example. Load balancer(s) 208 may forward requests to one of the application servers 216 and/or backend 218 servers, which may then reply to load balancer 208. This may allow load balancer(s) 208 to reply to cardholder device 202 without cardholder device 202 ever knowing about the internal separation of functions. It also may prevent cardholder devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., cardholder device 202) through a network (e.g., network 204), such as the Internet. In various examples, web servers, may deliver web pages, relating to, for example, online banking applications and the like, to clients (e.g., cardholder device 202). Web server(s) 210 may use, for example, a hypertext transfer protocol (HTTP/HTTPS or sHTTP) to communicate with cardholder device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from cardholder device 202 so cardholder device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the NET framework from Microsoft®, PHP application servers, and the like). The various application server frameworks may contain a comprehensive service layer model. Also, application server(s) 216 may act as a set of components accessible to, for example, a financial institution, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a reprogramming system, which may include additional capabilities, such as transaction card data generation and provision to enable the reprogramming of a transaction card, and the like. Backend 218 may be associated with various databases, including account databases that maintain, for example, cardholder information (e.g., demographic data, credit data, cardholder profile data, and the like), transaction card databases that maintain transaction card data and the like. Backend 218 also may be associated with one or more servers that enable the various services provided by system 200. Backend 218 may enable a financial institution to implement various functions associated with reprogramming a transaction card as shown and described herein. Backend 218 may include the various components of, for example, account provider system 130 and/or merchant system 150.

Figure 3:
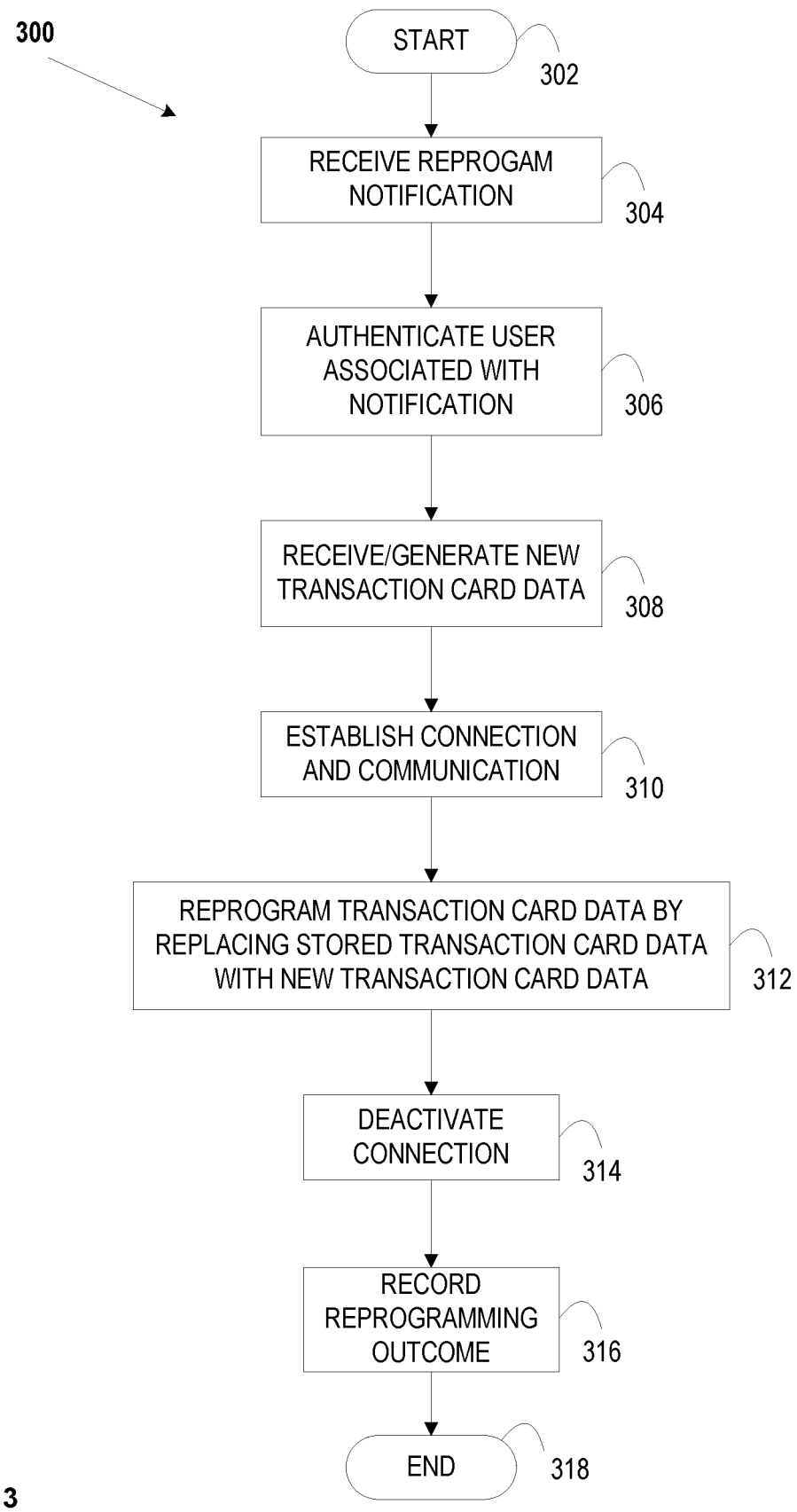
FIG. 3 depicts an example card authorization system according to embodiments of the disclosure.

FIG. 3 depicts an example method 300 employed by the system components described herein to reprogram a reprogrammable transaction card, similar to, for example, transaction card 120. Method 300 may begin at 302.

In block 304, a fraud notification may be received at a user device, such as user device 140. A fraud notification may be received from an account provider system upon fraud detection using algorithms available at the account provider system. A fraud notification may be received from a user via a user device upon detection of fraudulent activity. A fraud notification may be received from a merchant system upon attempted use of a transaction card that has been marked as associated with fraudulent activity. A fraud notification may be received via text, voice message, telephone call, email, push notification, and the like. Although fraud notifications are discussed herein, additional notifications may be received to indicate reprogramming of a transaction card is necessary. For example, an expiration notification, a PIN change notification, and the like, may all result in a notification transmitted to and received by a user device.

Once a fraud/reprogarm notification has been received on a user device, the user device may request user authentication (block 306). A user device may present a prompt that asks the user to authenticate that the user is the owner of the transaction card marked with fraudulent activity. A user device may also store an application that allows a user to authenticate him/herself as an cardholder, such as a mobile banking application or a mobile transaction card application. User authentication may occur using any authentication factor, such as a password, a PIN, biometrics (e.g., facial recognition, fingerprint recognition, voice recognition, and the like), and/or any combination of authentication factors. For example, user authentication may occur using various methods as shown and described in U.S. Pat. No. 9,053,476 and U.S. patent application Ser. Nos. 14/212,016 and 14/703,831, the entire contents of which are incorporated herein by reference.

An authenticated user may then receive and/or generate new transaction card data that may be used to reprogram the transaction card (block 308). New transaction card data may include, for example, transaction card numbers, security codes, expiration data, PINs, passwords, transaction card balance, transaction card spending limits, transaction card rates, and the like. New transaction card data may be received from an account provider system where it may be generated using, for example, a reprogramming system. New transaction card data may be received in encrypted and/or encoded form, which may require hardware and software components on the user device to decrypt and/or decode the new transaction card data. New transaction card data may be kept in encrypted and/or encoded form on a user device as well. New transaction card data may be generated, either at an account provider system or a user device, using a reprogramming module, which may include a random and/or pseudorandom number generator, comparison algorithms, data storage, one or more processors, an encryption engine, and the like. A random and/or pseudorandom number generator may be used to create at least a portion of the transaction card data. A comparison algorithm may be included in the reprogramming module to ensure unique transaction data is generated by comparing existing transaction card data across accounts to the new transaction card data that must be unique (e.g., transaction card number). Various encryption and encoding algorithms may be included in a reprogramming module to ensure secure delivery and storage of transaction card data.

Figure 4:
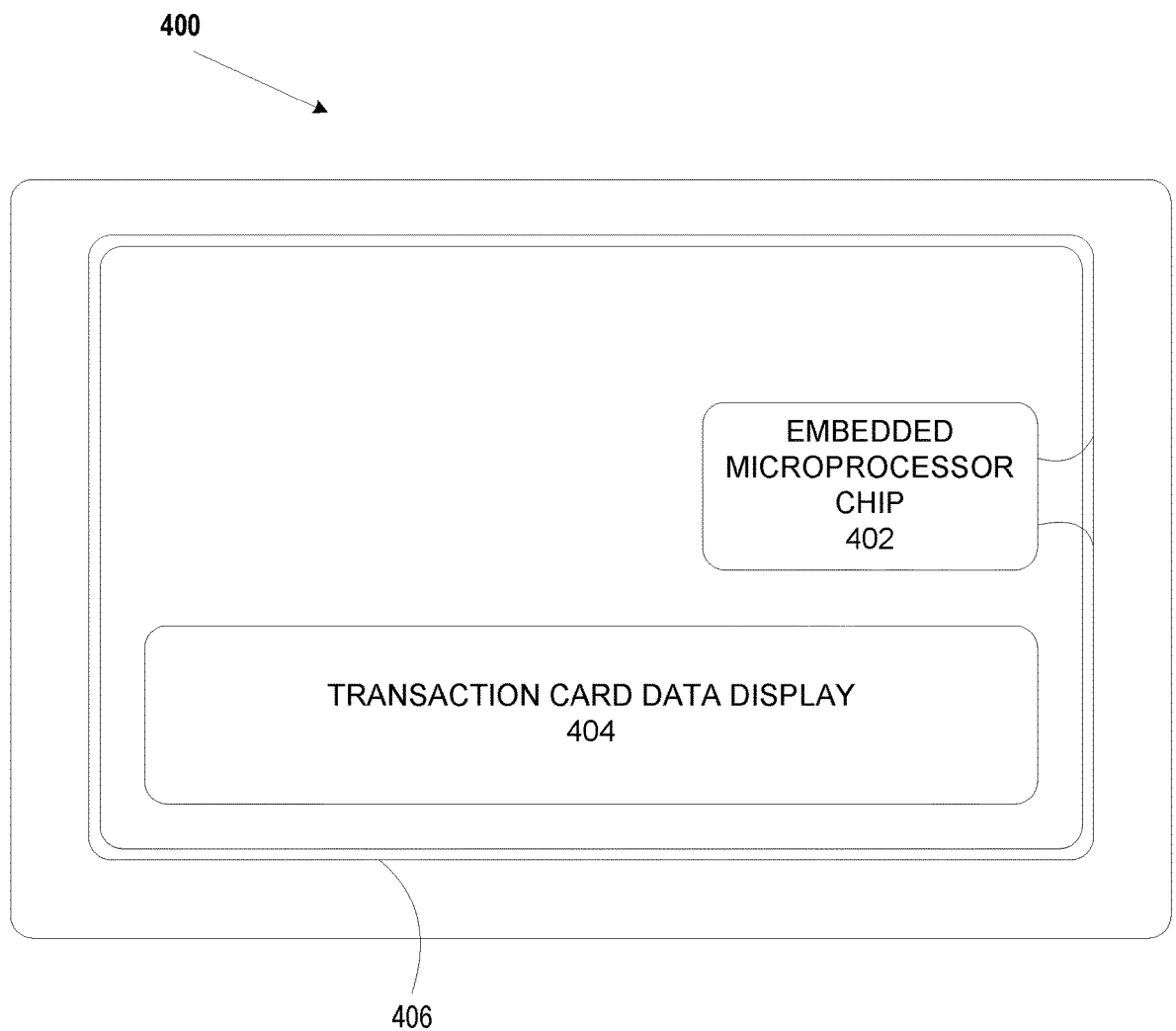
FIG. 4 depicts an example method for reprogramming a transaction card according to embodiments of the disclosure.

Upon receiving and/or generating new transaction card data, a user device may establish a connection and communication with a transaction card associated with fraudulent activity using the embedded microprocessor chip in the transaction card (block 310). For example, as illustrated in, for example, FIG. 4, which depicts an example reprogrammable transaction card, the embedded microprocessor chip (integrated circuit) 402, and wires 406 that serve as antenna for communication and power, connection and communication may be established using a Proximity Coupling Device (PCD), which may be a user device similar to user device 140. Effectively, transaction card 400 with the embedded microchip 402 and PCD behave like a transformer where an alternating current passes through an antenna in the PCD (not shown) and creates an electromagnetic field, inducing a current in the antenna 406 of the transaction card 400. Upon connection, an contactless interface is created between a PCD and the transaction card. Other ways to connect the PCD to the transaction card are contemplated. For example, the PCD could establish a Bluetooth Low Energy (BLE) connection to the transaction card.

Once an interface is established between the transaction card and a PCD (e.g., a user device), the transaction card may be reprogrammed (block 312). The reprogramming of the transaction card may occur through the use of kernels, or software, stored in the PCD or user device, that processes the transaction card data and sends a response to the transaction card indicating that the transaction card should delete at least a portion of the transaction card data and replace it with new transaction card data that was either generated or received by the user device. Referring to, for example, FIG. 4, the replacing of the transaction card data may result in new transaction card data such as a new transaction card number and expiration date. Accordingly, a reprogrammable transaction card may further include a display 404, such as an electronic display, that may be reprogrammed to display new transaction card data, such as a new transaction card number and new expiration date.

In block 314, after a transaction card has been reprogrammed (or effectively reissued), the connection between the user device and the transaction card may be deactivated. The results of the programming may be transmitted to the account provider system, where the results may be stored (block 316). For example, where the account provider generates the new transaction card data, the results may include whether the new transaction card data was successfully stored in the reprogrammable transaction card. As another example, where the user device generates the new transaction card data, the results may include the new transaction card data when the new transaction card data was successfully stored in the reprogrammable transaction card or a notification of a failure to reprogram the transaction card.

At block 318, the method may end. These examples are merely illustrative and transaction cards may be reprogrammed according to any data described herein.

As noted above, FIG. 4 depicts an example reprogrammable transaction card 400. Transaction card 400 may include an embedded microprocessor chip 402, which may be, for example an EMV chip. An EMV chip 402 may include a number of contacts that may interact with a terminal configured to read an EMV chip 402 (such as a point of sale terminal as shown and described in, for example, FIG. 5). During an EMV transaction, application cryptograms may be used to send and receive data packets between the transaction card 400 and a terminal, such as a merchant terminal, which may be similar to a terminal included at a merchant system 150. For example, data packets may include user authentication information which an acquisition system and/or issuing financial institution may use to authenticate a transaction card 400 during a transaction. Various cryptographic protocols and/or methods may be used in this data transmission and reception process. Offline data authentication may also take place using, for example public key cryptography to perform payment data authentication. For example, offline data authentication may use Static Data Authentication (SDA), Dynamic Data Authentication (DDA), and/or Combined Data Authentication (CDA). In various embodiments, EMV chip may be coupled to antenna 406 to enable contactless communication.

Transaction card 400 also may include transaction card data display 404. Display 404 may be provided within the transaction card 400. Display 404 may include, for example, a dot matrix display, as LED lighting, OLED lighting, and/or the like, may be used as display components. A number of dot matrix, LED or OLED lights may be used to illuminate various portions of the display in order to output information to a card holder.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A user device comprising:
one or more processors;
an antenna;
an input/output interface comprising an embedded near-field communication (NFC) chip; and
memory configured to store instructions to cause the one or more processors to:
receive, at the input/output interface, one or more authentication factors from a user;
determine, with the one or more processors, that the one or more authentication factors match one or more stored authentication factors;
receive new transaction card data from an account provider system;
create, with the antenna, a secure wireless connection between the user device and a reprogrammable transaction card;
transmit, via the secure wireless connection, instructions to the reprogrammable transaction card to delete at least a portion of existing transaction card data securely stored on an embedded microchip of the reprogrammable transaction card;
transmit, via the secure wireless connection, the new transaction card data and instructions to store the new transaction card data on the embedded microchip;
receive, via the secure wireless connection, a response from the reprogrammable transaction card;
determine, with the one or more processors, that the new transaction card data is stored on the reprogrammable transaction card based on the response;
deactivate, with the NFC chip of the input/output interface and the one or more processors, the secure wireless connection between the user device and the reprogrammable transaction card; and
transmit a confirmation to the account provider system that the reprogrammable transaction card has been updated with the new transaction card data.

2. The user device of claim 1, wherein the one or more authentication factors include at least one of: a password, a personal identification number (PIN), or a biometric identifier.

3. The user device of claim 2, wherein when the one or more authentication factors include the biometric identifier, the biometric identifier includes at least one of: facial recognition, voice recognition, or a fingerprint.

4. The user device of claim 1, wherein the one or more processors are configured to receive at least one of: a user-initiated notification or a third-party system initiated notification.

5. The user device of claim 4, wherein the user-initiated notification includes a notification received via the user device to reprogram the reprogrammable transaction card; and wherein the third-party system initiated notification includes at least one of: a fraudulent transaction notification from the account provider system, a declined transaction notification from a merchant system, an account expiration notification from the account provider system, or a PIN change notification from the account provider system.

6. The user device of claim 1, wherein the new transaction card data includes at least one of: a new transaction card number, a new transaction card expiration date, a new transaction card authentication code, new transaction card display data, a new transaction card balance, a new transaction card spending limit, or a new transaction card rate.

7. The user device of claim 1, wherein the secure wireless connection comprises a near-field communication (NFC) connection.

8. The user device of claim 1, wherein the existing transaction card data includes at least one of: a transaction card number, a transaction card expiration date, a transaction card authentication code, transaction card display data, a transaction card balance, a transaction card spending limit, or a transaction card rate.

9. The user device of claim 1, wherein the one or more processors are configured to encrypt the instructions to delete at least the portion of existing transaction card data securely stored on the embedded microchip of the reprogrammable transaction card.

10. The user device of claim 1, wherein the one or more processors verifies that the new transaction card data is unique by comparing the existing transaction card data to the new transaction card data.

11. A reprogrammable transaction card comprising:
an antenna; and
a microprocessor chip including:
a tamper-resistant secure element configured to store transaction card data; and
a reprogramming module configured to:
receive, via the antenna, a request for a wireless connection from a user device;
establish, via the antenna, the wireless connection with the user device;
receive, via the wireless connection, instructions from the user device to delete at least a portion of the stored transaction card data;
receive, via the wireless connection, new transaction card data and instructions to store the new transaction card data;
store the new transaction card data in the secure element based on the instructions;
transmit, via the wireless connection, a response to the instructions to store the new transaction card data, the response comprising a confirmation or refusal of replacing the at least a portion of the stored transaction card data with the new transaction card data;
provide, via the wireless connection, the new transaction card data to the user device; and
deactivate the wireless connection in response to a near-field communication (NFC) chip of the user device eliminating the wireless connection with the antenna.

12. The reprogrammable transaction card of claim 11, wherein the wireless connection comprises a near-field communication (NFC) connection.

13. The reprogrammable transaction card of claim 11, wherein the new transaction card data includes at least one of: a new transaction card number, a new transaction card expiration date, a new transaction card authentication code, new transaction card display data, a new transaction card balance, a new transaction card spending limit, or a new transaction card rate.

14. The reprogrammable transaction card of claim 11, wherein the reprogramming module is configured to delete at least a portion of the stored transaction card data, the stored transaction card data including at least one of: a transaction card number, a transaction card expiration date, a transaction card authentication code, transaction card display data, a transaction card balance, a transaction card spending limit, or a transaction card rate.

15. The reprogrammable transaction card of claim 11, wherein the reprogramming module encrypts the transaction card data stored on the reprogrammable transaction card, including the new transaction card data.

16. The reprogrammable transaction card of claim 11, further comprising a display to display the new transaction card data.

17. The reprogrammable transaction card of claim 16, wherein the new transaction card data includes at least one of: a transaction card number, an expiration date, or a card holder name.

18. The reprogrammable transaction card of claim 11, wherein the reprogramming module encrypts the response.

19. The reprogrammable transaction card of claim 11, wherein the microprocessor chip performs operations of a standard transmission protocol to perform offline data authentication.

20. A user device comprising:
one or more processors;
an antenna;
an input/output interface comprising a near-field communication (NFC) chip; and
memory, configured to store instructions that cause the one or more processors to:
receive, at the input/output interface, one or more authentication factors from a user;
determine, with the one or more processors, that the one or more authentication factors match one or more stored authentication factors;
generate a new credit card number using a pseudorandom number generator;
create, with the antenna, a wireless connection between the user device and a reprogrammable transaction card;
transmit, via the wireless connection, instructions to the reprogrammable transaction card to delete an existing credit card number securely stored on an embedded microchip of the reprogrammable transaction card;

transmit, via the wireless connection, the new credit card number and instructions to store the new credit card number on the embedded microchip;
receive, via the wireless connection, a response from the reprogrammable transaction card;
determine, with the one or more processors, that the new credit card number is stored on the reprogrammable transaction card based on the response;
deactivate, with the NFC chip of the input/output interface and the one or more processors, the wireless connection between the user device and the reprogrammable transaction card; and
transmit a confirmation to an account provider system that the reprogrammable transaction card has been updated with the new credit card number.

* * * * *